Feb. 8, 1966  HACHIRO NAKAMURA ET AL  3,233,653
RADIATING BURNER APPARATUS
Filed Dec. 13, 1963  5 Sheets-Sheet 1
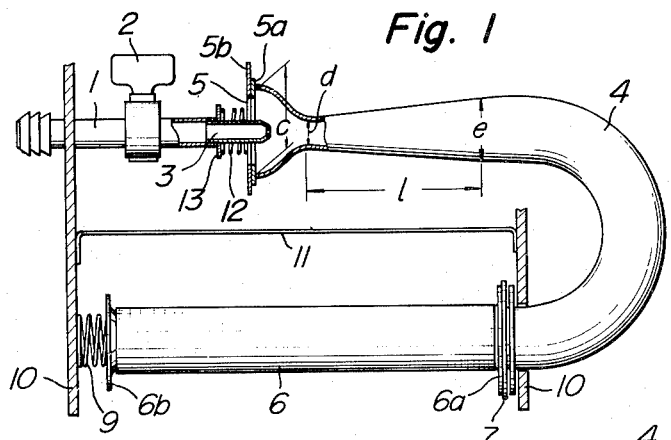
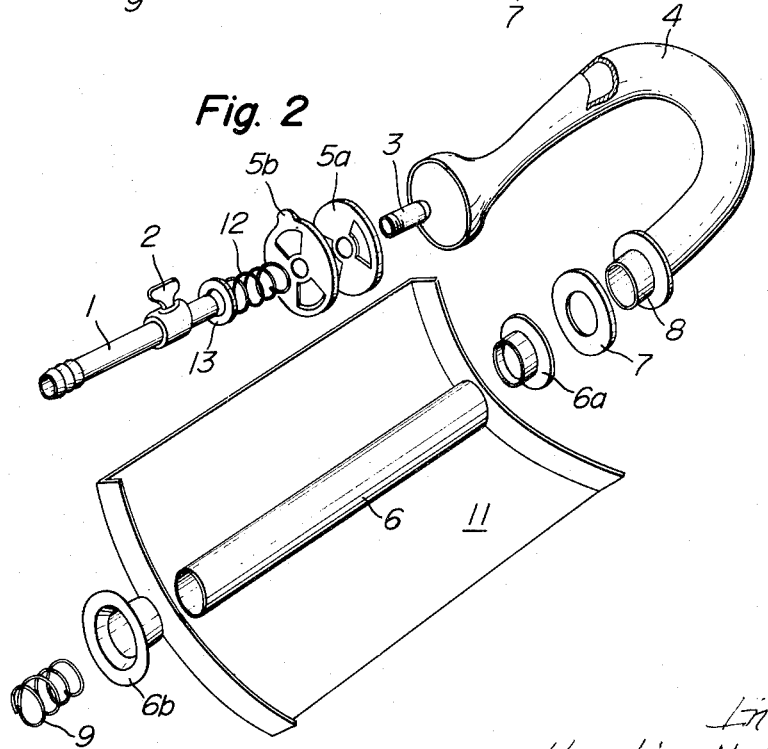
Inventors
Hachiro Nakamura
Tsuneo Kobayashi
Shigeru Tanimoto
Hiroo Hosono
By Stevens, Davis, Miller & Mosher
ATTORNEYS

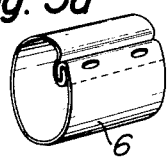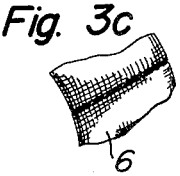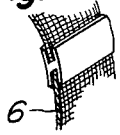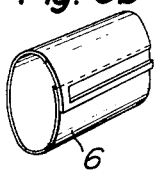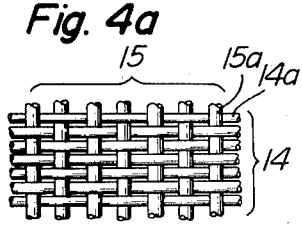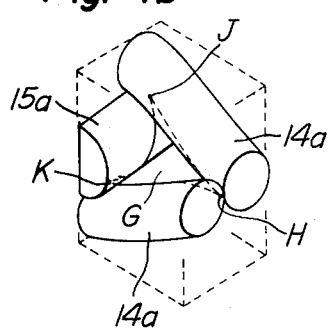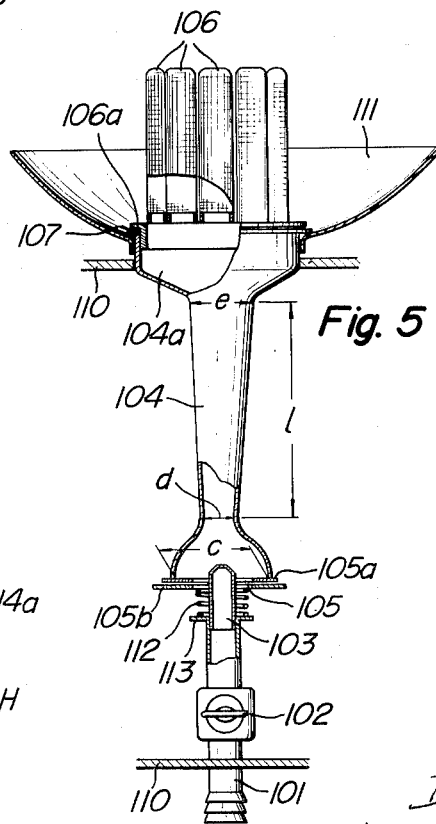

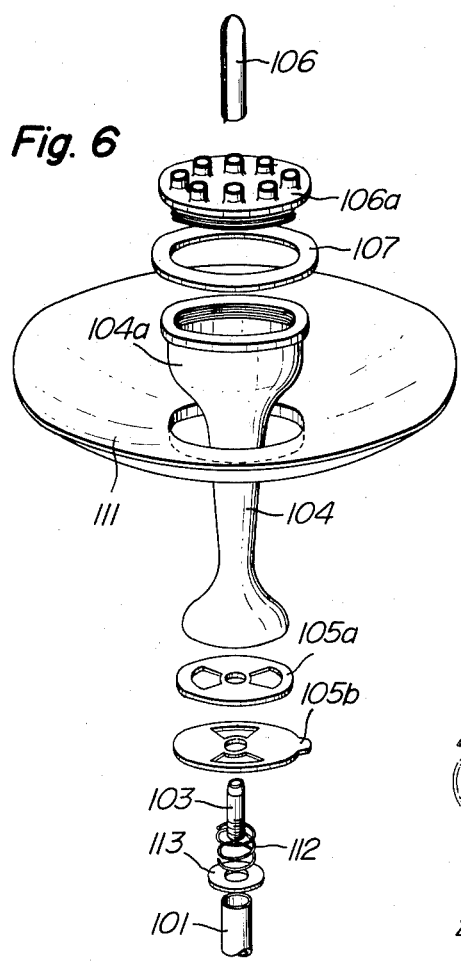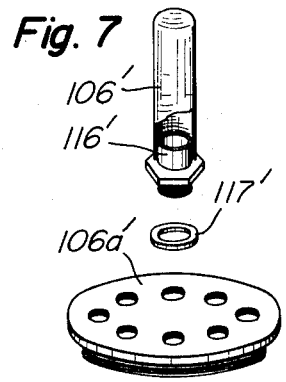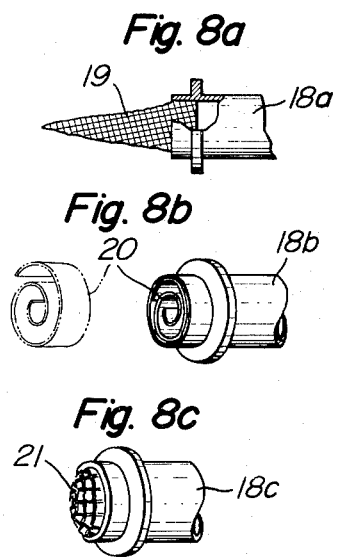

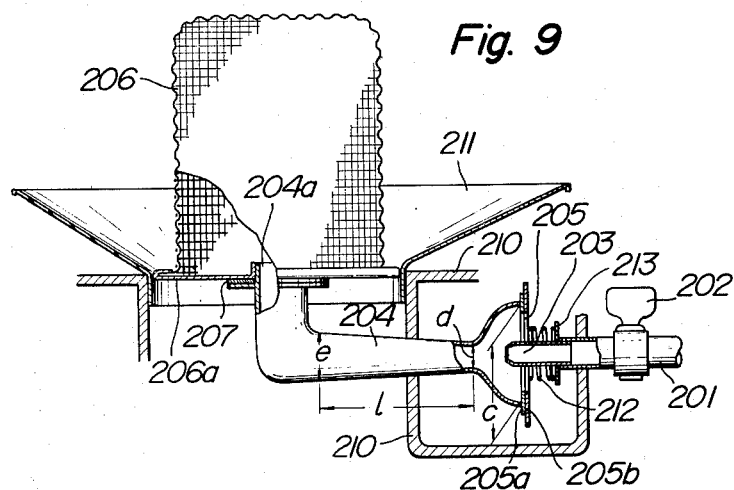
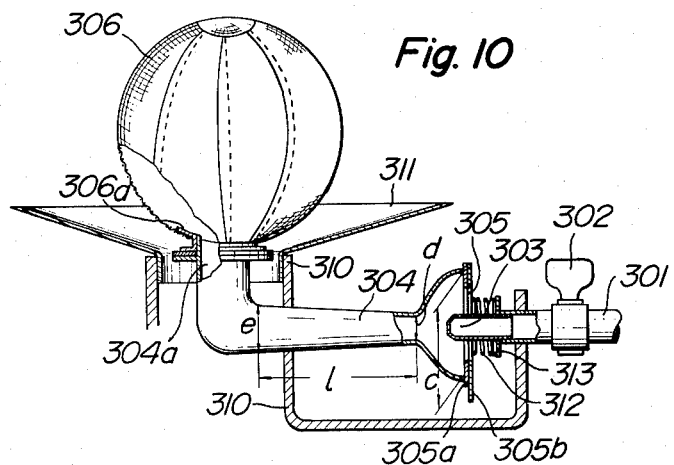
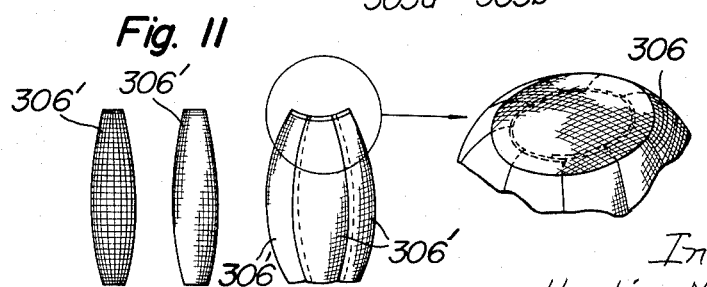

Inventors
Hachiro Nakamura
Tsuneo Kobayashi
Shigeru Tanimoto
Hiroo Hosono

United States Patent Office 3,233,653
Patented Feb. 8, 1966

3,233,653
RADIATING BURNER APPARATUS
Hachiro Nakamura, Kadoma-shi, Osaka, Tsuneo Kobayashi, Hirakata-shi, Shigeru Tanimoto, Kawachi-shi, Osaka, and Hiroo Hosono, Osaka, Japan, assignors to Matsushita Electric Industrial Co., Ltd., Osaka, Japan, a corporation of Japan
Filed Dec. 13, 1963, Ser. No. 330,377
Claims priority, application Japan, Dec. 14, 1962, 37/56,971; Dec. 18, 1962, 37/77,389; July 6, 1963, 38/51,542, 38/51,544; July 19, 1963, 38/39,260; Sept. 30, 1963, 38/75,087, 38/75,088, 38/75,089
9 Claims. (Cl. 158—99)

This invention relates to a radiating burner apparatus in which combustible gases or liquids are used as fuel and more particularly to such a burner apparatus which is quick-radiating, safe to use, which is of high heat radiating efficiency and of simple construction and may be manufactured easily and inexpensively, and in which the fuel can be burned perfectly. In well known radiating burners, nozzles for fuel of the burner have been formed of casting or ceramic material, flame has been produced by combustion of the fuel at the nozzles, and thus a radiator body (screen, wiregauge, disc ceramic body, metallic mesh, etc.) disposed close to the nozzles have been heated to radiate heat radiation. Since such apparatus must be provided with a burner proper and a radiator body for producing heat radiation, it is subject to heat loss at the side of the burner and structural complexity induced in connection of the burner proper and the radiator body, and the radiator body might not be heated to red heat or combustion might be imperfect owing to inadequate spacing between the burner proper and the radiator body. In the case where the fuel is directly ejected through a planely woven wire screen of large mesh to be burned, combustion becomes unstable owing to reduction of resistance at the fuel nozzles and sometimes even backfiring occurs. In order to avoid such instability, ejecting resistance to the fuel is increased by using a fine mesh metal wire screen or a multiplicity of screens. Of these means, the former means which utilize a fine mesh screen has a defect that the diameter of its wire is so reduced that the strength of the screen is exceedingly deteriorated and the latter means inadvantageously make the construction of the radiator body complex and its heat capacity greater since several screens of relatively coarse mesh are to be superposed in order to increase resistance at the fuel nozzles. As a result, heat radiating efficiency is exceedingly lowered and building-up of combustion retarded.

Furthermore, in a flat type burner having a radiator body made of ceramic or wire screen as used in conventional radiating burners, since radiation is emitted from both the front and back faces of the radiating body, part of radiation radiated backwise is absorbed by parts or device of the apparatus and cannot be fully utilized.

When a flat type burner is made of material such as ceramic, this ceramic body must be provided with many minute bores in it for passing fuel mixture so that it is subject in part or as a whole to cracks as a result of repeated thermal dilatation and contraction of the burner material between burning and extinction. The radiating burner apparatus having planely woved screens has also required complex support structure or undulatory formation of the screens for compensating thermal dilatation and contraction.

When the burner is made of material such as ceramic, it is likely to be destroyed by mechanical vibration or shock during manufacture, transportation or use owing to the property of the material and further replacement of the part is not so easy.

With burners using ceramic or a multiplicity of screen sheets, considerable time is consumed until the radiating body is sufficiently heated up as the burner proper has large heat capacity.

It is an object of the present invention to provide a radiating burner apparatus which obviates many disadvantages in conventional apparatus and which comprises a nozzle for ejecting fuel, a mixing chamber for mixing primary air with the ejected fuel by suction effect caused by flowing velocity of the fuel being ejected from said nozzles, a heat resistant screen burner arranged in communicating relation to said mixing chamber; orifices in said screen burner for ejecting said mixed fuel, each being inclined to a normal line thereat to the surface of said screen burner and formed of a mesh of said screen burner, and means for causing said mixed fuel ejected through said orifices to be burned. Thus the radiating burner apparatus according to the present invention is highly effective in heat radiation, possible to generate promptly heat radiation owing to its rapid build-up of burning, simple in construction of its burner proper, easy to manufacture, little of damage or trouble in the burner, and structurally firm and economical.

Another object of the present invention is to provide a metal screen burner of a radiating burner apparatus which is formed by weaving first group of wire elements arranged in relatively sparse parallel relation to constitute warps and second group of wire elements arranged in relatively close parallel relation to constitute wefts being orthogonal to the first group of wire elements with a later specified procedure so that a wire element of the first group and two adjacent wire elements of the second group forms an orifice for ejecting the mixed fuel which tilts to a normal line thereat to the woven surface, thereby ejecting resistance of fuel gas and mechanical strength of the screen burner being increased and the fuel gas ejected through the metal screen burner being burned making very short flames which form an exceedingly thin layer. This layer of the flames heats the metal screen burner formed of said groups of wire elements itself to red heat to emit heat radiation. Thus the temperature of the metal screen burner may be maintained constant throughout its surface and consequently above mentioned advantage is attainable.

Another object of the invention is to provide a radiating burner apparatus which is more effective in heat radiation and in which the burner construction and its supporting mechanism are more simplified than conventional apparatus by forming the screen burner provided with said orifices into elongated tubular shape.

Another object of the invention is to provide a radiating burner apparatus which is more efficient in heat radiation than the case of a tubular screen burner owing to heat interference between the screen burners by arranging a plurality of said tubular screen burner in proximity and parallel to one another.

Another object of the invention is to provide a radiating burner apparatus which is highly efficient in heat radiation but simple in construction and supported with simple and easy means by forming said screen burner having the above mentioned orifices in the form of a cage, sphere or curved dish and which is suitable for small-scale heating as for domestic use and also accommodated to large-scale heating as employed in factories or orifices by being provided with a plurality of said screen burner.

Another object of the invention is to provide a radiating burner apparatus which can be used simply and easily and which may be invested with directivity by which heat radiation radiated inherently in all directions are restricted in a desired direction by being provided with a reflector for forcing the heat radiation from the screen burner to travel in any desired direction in proximity of the screen burner having aforementioned orifices.

Another object of the invention is to provide an excellent radiating burner apparatus having a metal screen burner which can be made very easily and manufactured economically, which is suitable for mass production and which is not likely to be damaged by mechanical vibration or shock during manufacture, transportation or use by reinforcing the juncture of the screen burner by either welding or attaching joiners.

These and other objects and advantages of the invention will be more apparent from the following detailed description taken in reference to the accompanying drawings in which:

FIG. 1 shows a side elevation view of a radiating burner apparatus according to the present invention, illustrating its nozzle portion in cross section;

FIG. 2 is an exploded perspective view of the apparatus shown in FIG. 1;

FIG. 3a is a fractional perspective view of an embodiment of a metal screen burner to be used in the radiating burner apparatus according to the present invention showing the case that a juncture portion is spot welded;

FIGS. 3b, 3c and 3d are further three embodiments of a screen burner to be used in a radiating burner apparatus according to the present invention and show seam-welded, counter welded junctures and that caulked by a H-shaped fittings, respectively;

FIG. 4a shows an enlarged fractional plan view illustrating the weaving manner of a screen burner;

FIG. 4b is a diagrammatic representation of an orifice for ejecting fuel mixture formed of a mesh of a screen burner;

FIG. 5 is a top plan view partly broken away of a further embodiment of a radiating burner apparatus of the present invention comprising a plurality of the tubular screen burner as shown in FIGS. 1 and 2;

FIG. 6 shows an exploded perspective view of the apparatus shown in FIG. 5;

FIG. 7 shows an exploded perspective view of another embodiment of a tubular screen burner different in attaching mechanism from that shown in FIG. 6 wherein one of the screen burners is shown representatively;

FIG. 8a is a side elevation in longitudinal section of an inlet for fuel of another embodiment having a resistor to gas flow in the inlet of the screen burner shown in FIGS. 1 or 5, showing the case that a conical screen is used for the resistor to gas flow;

FIGS. 8b and 8c show two further embodiments of a resistor to gas flow as shown in FIG. 8a, and those formed of a spiral metal strip and semi-spherical screen, respectively;

FIG. 9 is a side elevation partly in section of another embodiment of a radiating burner apparatus using a metal screen formed in the form of a cage;

FIG. 10 is a side elevation partly in section of another embodiment of a radiating burner apparatus using metal screen formed in the form of a sphere;

FIG. 11 is a diagrammatic view illustrating the construction of the spherical screen burner as shown in FIG. 10;

Figure 12:
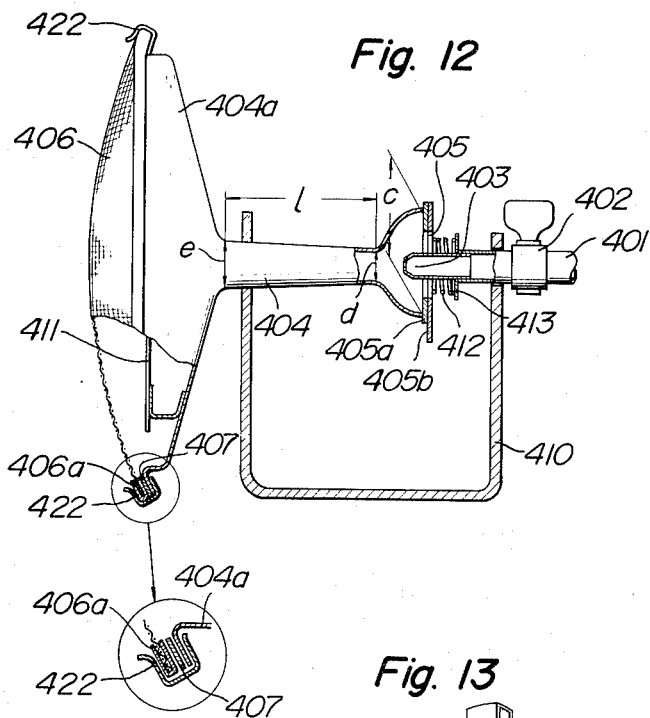
FIG. 12 is an elevation view partly in section of another embodiment of a radiating burner apparatus according to the present invention using a screen burner constructed in the form of a dish having a curved face.

Referring to the drawings, particularly to FIGS. 1 and 2 which illustrates an embodiment of a radiating burner apparatus according to the present invention, a fuel supply pipe 1 is provided with a control cock 2 for adjusting flow therein and a fuel ejecting nozzle 3. A trumpet-like mixing tube 4 is disposed in front of the nozzle 3. Between the mixing tube 4 and the ejecting nozzle 3 is disposed an adjustable control means 5 for adjusting inflow of primary air. One end of a cylindrical metal screen burner 6 is connected to an end of the mixing tube 4 by means of a flanged collar 6a fitted on the end of the burner 6. The other end of the screen burner 6 is adapted to be sealed by a metal cover 6b. The cylindrical screen burner 6 is resiliently supported on a base frame 10 by means of a coil spring 9 disposed between the metal cover 6b and the base frame 10.

More particularly, the fuel supply pipe 1 is fixedly mounted on the base frame 10 and the tip of the nozzle 3 disposed at an end of the supply pipe 1 opposite to the trumpet-like inlet for primary air of the mixing tube 4. The nozzle 3 is threaded into the supply pipe 1 and an end of a coil spring 12 is engaged against a stepped portion formed between the supply pipe 1 and the nozzle 3. The other end of the coil spring 12 bears resiliently against an air damper rotatable plate of the control means 5 disposed between the nozzle 3 and the mixing tube 4 for adjusting inflow of the primary air. The control means 5 for adjusting inflow of the primary air comprises an air damper base 5a which is rigidly mounted on the end of the inlet for the primary air of the mixing tube 4 and the air damper rotary plate 5b which is rotated about the axis of the nozzle 3 in sliding contact with the air damper base 5a by means of the coil spring 12. Each of the air damper base 5a and the air damper rotatable plate 5b is provided with two throughbores or vent ports, each in the form of a sector having vertex angle of 90°, which are disposed in symmetrical positions in respect to the axis of the nozzle 3.

When the fuel is to be burned in the burner apparatus, the air damper rotatable plate 5b is adjusted and fixed in a predetermined position relative to the air damper base 5a in accordance with heat value of the fuel used in the apparatus as to supply sufficient primary air to maintain best burning condition during combustion of the burner. The mixing tube 4 comprises the inlet for the primary air and a mixing chamber in which the fuel is mixed with the primary air. The inlet for the primary air is tapered to form a trumpet-like portion, and after passing through a narrowest neck portion gradually enlarged with moderate gradient.

As for the structure of the mixing tube 4, appropriate dimension may be determined according to the configuration and capacity of the burner apparatus. This embodiment has been designed to be used with town gas of 360 kcal./m.$^3$ heat value. If a nozzle of 2.6 mm. in diameter is to be used at gas pressure of 40 to 100 mm. Ag, it is adequate to select the inlet for the primary air of $c=60$ mm. in diameter, the narrowest neck portion of $d=15$ mm. in diameter and the spread portion of $l=90$ mm. in length and of $e=22$ mm. in largest diameter. Then, the appropriate area of the vent ports in the control means 5 for adjusting inflow of primary air is from 0.7 cm.$^2$ to 2.8 cm.$^2$.

One end of the cylindrical screen burner 6 engages with a stepped terminal portion 8 of the mixing tube 4 through the intermediary of a packing and the other end of the cylindrical screen burner 6 is supported resiliently on the base frame 10 by means of the coil spring 9.

The cylindrical screen burner 6 is formed by rolling a flat sheet of screen into cylindrical form and its seam is spot welded after folded as shown in FIG. 3a. The flanged collar 6a and metal cover 6b are mounted on and spot welded to the respective ends of the cylindrical screen burner 6. When it is desired to detach the cylindrical screen burner 6, the screen burner 6 may be forced axially leftward, viewed in FIG. 2, against the coil spring 9. Then the flanged collar 6a of the cylindrical screen burner 6 is disengaged from the stepped portion 8 of the mixing tube 4 so that the right end, seen in FIG. 2, of the cylindrical screen burner 6 can be shifted freely toward the reader. If the screen burner is released from the coil spring 9 at this moment, the coil spring 9 is kept fixed to the base frame 10 and the screen burner may be removed easily. The screen burner may be also easily attached by following contrawise the sequence of the above mentioned attaching operation.

The feature of the radiating burner apparatus according to the present invention consists in the structure of the metal screen burner. The metal screen burner comprises, as shown in FIGS. 4a and 4b, first group 15 of wire elements which consists of a plurality of heat resistant steel wires 15a of 0.16 to 0.3 mm. in diameter arranged in equidistant parallel relation of from 10 to 30 wires per inch and second group 14 of wire elements which consists of another plurality of heat resistant steel wires 14a of 0.16 to 0.3 mm. in diameter arranged in equidistant parallel relation of from 70 to 200 wires per inch in orthogonal relation with first group 15 of wire elements. Each wire element 14a of the second group 14 is woven zigzag with the wire elements 15a of the first group 15 with the adjacent wire elements of said second group 14 being alternately undulated. An area, which is defined by a contact point H between two adjacent wire elements 14a, 14a of the second group 14 of wire elements and lines linking respective crests of the two adjacent wire elements 14a, 14a extending from the contact point H and contacting with the upper and lower sides of a wire element 15a of the first group 15 which lies close to the point H, forms an ejecting orifice G for the fuel mixture which inclines to a normal line thereat to the woven surface of the screen burner. With such a metal screen burner including a multiplicity of such orifices, not only ejecting resistance of the gas but mechanical strength are increased. Furthermore, flow of fuel gas within the screen burner may be made smooth all over the surface of the burner, the fuel gas may be well distributed and combustion may be made stable and uniform. Although it is to be understood that mesh of the screen burner 6 may be determined according to burning capacity and dimensional specification of the burner apparatus, in the above mentioned embodiment a cylindrical metal screen burner having burning capacity of 2100 kcal./h. and fuel gas or town gas having heat value of 3600 kcal./m.³ have been employed, and the second group 14 or group of wefts and the first group 15 or group of warfs have been arranged in 150 wires per inch and 20 wires per inch, respectively. Diameters of the wefts 14a and warf 15a are 0.18 and 0.22 mm., respectively. Inner diameter and length of the burner cylinder are 20 and 260 mm., respectively. The reflecting plate 11 is Cu-Ni-Cr plated on its surface and forms parabolic surface parallel to the burner 6. The reflecting plate 11 is rigidly secured to the base frame 10 and the screen burner 6 is located at the focus of the parabolic surface formed of the reflecting plate 11.

In operation, when the cock 2 for adjusting the flow of fuel is opened, the fuel gas which is supplied through the fuel supply pipe 1 is ejected into the mixing tube 4 from the tip of the ejecting nozzle 3. Then, by sucking action of the ejected fuel gas, air is drawn into the mixing tube 4 through the vent ports composed of the preset air damper base 5a and air damper rotatable plate 5b of the control means 5 for adjusting inflow of primary air and, after mixed well with the fuel gas, delivered into the screen burner 6 through the mixing chamber end of the mixing tube. At this point, if the caliber c of the inlet for primary air is too small, suction of air will be insufficient, resulting in occurrence of imperfect combustion. If the caliber is larger than needed, size of the apparatus merely increases without resulting in appreciable promotion of air suction effect. When the diameter d of the neck portion of the air inlet is too small, sucked air is insufficient for perfect combustion similar to the case described above. When the diameter d of the neck portion is too large, suction effect is weakened resulting in want of air. As for the spread portion l, its optimum length may be determined in reference to the diameter d of the neck portion. In order to mix the sucked air sufficiently with the fuel gas, the length of the spread portion l must be 6 to 8 times as large as the diameter d of the neck portion. The optimum largest diameter e of the spread portion l depends upon the dimension of the burner. If the largest diameter e of the spread portion l is too large, velocity of the mixed gas ejected from the nozzle 3, will be lowered and as a result backfiring might be caused, and if it is too small, as a result of increasing of velocity of the mixed gas at the ejecting orifices of the cylindrical screen burner 6, reaction in and hence red heat of the screen burner become uneven. The maximum diameter e of the spread portion is preferably one to three times as large as the diameter of the neck portion. The mixed fuel gas supplied to the cylindrical screen burner is attenuated adequately by the wire elements of the screen burner and ejected uniformly over the surface of the screen burner through its meshes. This gas is burned by ignition at the surface of the burner. This combustion is composed of a layer of very short flames on the surface of the cylindrical screen burner. By the combustion heat of these flames the groups 14 and 15 of wire elements of the screen burner 6 is heated to red heat to radiate heat radiation. Part of the heat radiation radiated from all over the cylindrical screen burner which is directed to the reflecting plate 11 is partly absorbed by the plate 11 and for the most part reflected thereby to be directed to surroundings to be heated.

At this point, when the cylindrical screen burner 6 dilates with rise of its temperature, this dilatation is absorbed by the coil spring 9 without occasioning strain in the cylindrical screen burner. When the cylindrical burner 6 is cooled and contracted upon extinction of fire by interruption of combustion, the coil spring 9 is allowed to elongate to prevent the cylindrical screen burner 6 to be detached from the base frame 10.

Referring to FIGS. 5 and 6 which illustrate another embodiment according to the present invention a fuel supply pipe 101 is rigidly secured to a base frame 110 and has a control cock 102 mounted thereon for adjusting flow through the pipe 101. A nozzle 103 for ejecting fuel is mounted on an end of the fuel supply pipe 101 and opposite to a trumpet-like inlet for primary air of a mixing tube 104. Between the ejecting nozzle 103 and the mixing tube 104 is disposed an adjustable control means 105 for adjusting inflow of the primary air. Cylindrical metal screen burners 106 are at its lower ends fitted into a fixture plate 106a for fixing the screen burner 106 with the fixture plate being threadedly secured to an end of the mixing tube 4. The nozzle 103 is threaded into the supply pipe 101. A washer 113 which is fitted over the nozzle 103 is pressed against and engaged with a stepped portion formed at the connection of the fuel supply pipe 103 and the nozzle 103 by a coil spring 112. The end of the coil spring 112 remote from the washer 113 bears resiliently against an air damper rotatable plate of the control means 105 for adjusting inflow of the primary air. The control means 105 for adjusting inflow of the primary air comprises an air damper base 105a which is rigidly mounted on the end face of the inlet for the primary air of the mixing tube 104 and the air damper rotatable plate which is rotated about the axis of the nozzle 103 in sliding contact with the air damper base 105a by means of the coil spring 112. Each of the air damper base 105a and the air damper rotatable plate 105b is provided with two throughbores or vent ports each being in the form of a sector having vertex angle of 90° which are symmetrically disposed in respect to the axis of the nozzle 103. During the time the fuel is burned in the burner apparatus, the air damper rotatable plate 105b is adjusted and fixed in a predetermined position relative to the air damper base 105a according to heat value of the fuel used to supply sufficient primary air to maintain optimum burning condition. The mixing tube 104 comprises the inlet for the primary air and a mixing chamber for mixing the primary air with the fuel. The inlet for the primary air is tapered to form a trumpet-like portion, and after passing through a narrowest neck portion gradually enlarged with moderate gradient. The terminal portion of the mixing tube 104 constitutes a mixing chamber 104a.

In this embodiment, for fuel gas, for example, propane gas having heat value of 11,000 kcal./m.³ is used. When the nozzle of 0.9 mm. in diameter at gas pressure 200 to 400 mm. Ag, it is preferable that the diameter of the narrowest neck portion is $d=18$ mm., length of the spread portion is $l=90$ mm. and the maximum diameter of the spread portion is $e=35$ mm. For these values, adequate area of the throughbores of the control means 105 for adjusting the inflow of the primary air is 14 to 25 cm.² Each of the plurality of the cylindrical screen burners 106 which are parallel and close to one another is spot welded to the cylindrical screen burner base 106a which is threaded into the mixing chamber 104a through a packing 107. Each of the cylindrical screen burners is made by rolling a flat metal screen into a cylinder and its ends are, for example, a superposed and seam welded at the seam as shown in FIG. 3b. When it is desired to detach the cylindrical screen burner 106 from the base 106a, this is easily attained by releasing threaded securing between them as shown in FIG. 6.

The cylindrical screen burner 106 in this embodiment is constructed similarly to the embodiment shown in FIG. 4, and the mesh is also similarly determined by burning capacity and dimension of the burner. In this embodiment, for a burner of burning capacity of 21,000 kcal./b., propane gas having heat value of 11,000 kcal./kg. is employed. The second group of wire elements, or group of warps is arranged in 120 wire elements per inch and the first group of wire elements or group of wefts is arranged in 16 wire elements per inch. Diameters of the warps 14a and the wefts 15a are 0.30 mm. and 0.22 mm., respectively. Inner diameter and length of the burner cylinder are 14.4 mm. and about 50 mm., respectively. Eight such burner cylinders are arranged equidistantly about a circle of 35 mm. radius.

A reflector plate 111 having its surface Cu-Ni-Cr plated is fixedly secured to the base frame 110 so that the surface forms a parabolic surface of which focus is positioned at the group of the cylindrical screen burners.

In operation of the embodiment shown in FIGS. 5 and 6, when the cock 102 for adjusting the flow of fuel is opened, the fuel gas supplied through the fuel supply pipe 101 is ejected into the mixing tube 104 from the tip of the ejecting nozzle 103. At this time, by sucking action of the ejected gas, air is drawn into the mixing tube 104 through the vent parts composed of the preset air damper base 105a and air damper rotatable plate 105b of the control means 105 for adjusting inflow of the primary air. The primary air thus drawn in is mixed sufficiently with the fuel gas within the mixing tube 104 and delivered into the screen burners 106 through the terminal portion of the mixing chamber of the mixing tube.

In this case, if the caliber C of the inlet for the primary air is small, suction of air will be insufficient resulting in occurrence of imperfect combustion. On the contrary, when the caliber is larger than needed, the size of the apparatus merely increases without resulting in appreciable promotion of sucking effect. If the diameter of the neck portion of the inlet for the primary air is small, sucked air is insufficient for perfect combustion, and if it is too large, suction effect is weakened resulting in want of air.

The optimum length of the spread portion $l$ may be determined in connection with the diameter $d$ of the neck portion, and the length must be 6 to 8 times as large as the diameter of the neck portion in order to mix the fuel gas with the sucked air sufficiently.

Further, the optimum diameter of the widest part of the spread portion $l$ may be determined according to the specification of the burner apparatus. If this diameter is too large, velocity of the mixed gas ejected from the nozzle 103 will be lowered and as a result backfiring might be caused. If it is too small, velocity of the mixed gas at the orifices of the cylindrical screen burner will be increased resulting in uneven reaction in and hence uneven red heat of the screen burner. The maximum diameter $e$ of the spread portion is preferably one to three times as large as the diameter of the neck portion. The mixed gas, being applied with adequate resistance by the wire elements of the cylindrical screen burner, is ejected uniformly over the surfaces of the burners through their meshes and burned by ignition at the surfaces of the burners. This combustion is composed of a layer of very short flames on the surfaces of the cylindrical screen burners. Heat of this combustion heats up the cylindrical screen burner themselves to red heat to produce heat radiation. Part of the heat radiation radiated from the screens of the cylindrical screen burners 106 is directed toward the reflector plate 111, and then partly absorbed thereby and for the most part reflected thereby to be radiated to the surroundings to be heated. It should be noted in this connection that the rays of heat radiation radiated from the plurality of cylindrical screen burners 106 intereferes each other to raise effectively the surface temperature of each cylindrical screen burner 106 by 5 to 10 degrees in C. Thus heat radiation efficiency and stability against ambient wind may be increased.

In FIG. 7 there is shown another embodiment of method for attaching the cylindrical screen burner. A collar 116' for attaching the cylindrical screen is threaded on its end and adapted to be screwed into a threaded bore in a burner base 106a' of a cylindrical screen burner 106'. Middle portion of the collar 116' is enlarged in hexagonal shape to facilitate to secure the collar 116' to the burner base 116a'. When the cylindrical screen burner should be impaired by any chance, it may be easily and promptly repaired by releasing and removing the collar 116' from the burner base 106a'. A packing 117' is interposed in order to prevent leakage of gas from the screwed region upon attaching.

In FIGS. 8a, 8b and 8c there is shown another embodiment for the purpose of obtaining stable combustion by applying resistance to the ejected gas by means of an attenuator of gas flow arranged in a portion of the inlet for fuel in the cylindrical screen burner shown in FIGS. 1 or 5, in order to prevent uneven combustion when the screen burner is elongated one. This embodiment includes three variations as shown in the figure.

As the first variation a gas flow attenuator 19 which is formed of conical screen of 8 to 40 mesh wires is mounted on an ejecting end 18a of the mixing tube. Similarly a gas flow attenuator 20 which is the second variation and formed of a spiral metal strip is to be mounted on an ejecting end 18b of the mixing tube, and a gas flow attenuator 21 which is the third variation and formed of a semisphere of metal screen of 8 to 40 meshes is to be mounted on an ejecting end 18c of the mixing tube. These gas flow attenuators are each fitted into the terminal end of the gas ejecting end 18a, 18b or 18c of the mixing tube.

If the cylindrical screen burner is made exceedingly elongated as compared with the embodiments described previously without using such a gas flow attenuator, flowing velocity of gas at the fuel ejecting orifices of the cylindrical screen burner becomes so high that the areas of the combustion surface about the fuel ejecting orifices are cooled and burning reaction is interrupted as a consequence. When such a gas flow attenuator of conical screen 19, spiral metal strip 20 or semispherical flat screen 21 is mounted on the fuel ejecting end of the mixing tube, it applies resistance to the gas flow to lower the velocity thereof. As a result, stable and uniform combustion is obtained all over the surface of the cylindrical screen burner.

Still another embodiment of a radiating burner is shown in FIG. 9 which has a screen burner in the form of a cage.

In FIG. 9, a gas flow adjusting cock 202 is mounted on a fuel supply pipe 201. A fuel ejecting nozzle 203 is mounted on the fuel supply pipe 201 at the ejecting end thereof and opposite to a trumpet-like mixing tube 204. Between the mixing tube 204 and the ejecting nozzle 203 is disposed an adjustable control means 205 for adjusting inflow of primary air. A screen burner 206 in the form of a cage is secured at its lower end to an end 204a of the mixing tube 204 through a fixture disc 206a. The fuel supply pipe 201 is fixedly secured to a base frame 210. The tip of the nozzle 203 mounted on the end of the fuel supply pipe 201 opposes a trumpet-like inlet for primary air of the mixing tube 204. The nozzle 203 is threadedly mounted in the fuel supply pipe 201 and a coil spring 212 presses a washer 213 fitted over the nozzle 203 against a stepped portion formed in the connection of the fuel supply pipe 201 with the nozzle 203. The end of the coil spring remote from the nozzle 203 bears against an air damper rotatable plate of the control means 205 for adjusting inflow of the primary air disposed between the nozzle 203 and the mixing tube 204. The control means 205 for adjusting inflow of the primary air comprises an air damper base 205a which is rigidly secured to the end face of the inlet for the primary air of the mixing tube 204 and the air damper rotatable plate 205b which is urged by the coil spring 212 into sliding contact with the air damper base 205a and rotatable about the axis of the nozzle 203. Each of the air damper base 205a and air damper rotatable plate 206b is provided with two vent throughbores in sector shape each having vertex angle of 90° which are positioned symmetrically in respect to the axis of the nozzle 203. When the fuel is burned in the burner apparatus, the air damper rotatable plate 205b is adjusted and fixed in a predetermined position relative to the air damper base 205a according to heat value of the fuel used to supply sufficient primary air to maintain optimum burning condition. The mixing tube 204 comprises the inlet for the primary air and a mixing chamber for mixing the primary air with the fuel. The inlet for the primary air is tapered to form a trumpet-like portion, and after passing through a narrowest neck portion gradually enlarged with moderate gradient. Although the structure of the mixing tube 204 may be determined in adequate dimension according to the configuration and burning capacity of the burner apparatus, this embodiment, in which propane gas having heat value of 11,000 kcal./kg., for example, is used for the fuel gas, may be made similarly to the embodiments described previously.

The fixture disc 206a for the cage-shaped screen burner is provided centrally with a circular hole which is bent upward and into which the end of the mixing tube is adapted to be inserted. A packing 207 is interposed between the mixing tube 204 and the attaching disc 206a in order to prevent leakage of gas. The cage-shaped screen burner 206 is manufactured by forming a flat screen into the shape of a cage and welding its opposite ends, for example, in end to end contacting condition as shown in FIG. 3c. The cage shaped screen burner 206 can be readily attached and detached by inserting into and pulling out from, respectively, the fixture disc 206a.

Structure of the cage-shaped screen burner 206 in this embodiment is similar to that of the embodiment shown in FIGS. 4a and 4b and its mesh may be determined in accordance with the burning capacity and dimensional specification of the burner apparatus. In this embodiment, propane gas of heat value of 11,000 kcal./kg. is used in a burner apparatus of burning capacity of 2100 kcal./h., the first warp and second weft groups 15 and 14, respectively, of wire elements are arranged in 16 and 120 wire elements per inch, respectively. The wefts 14a are of 0.30 mm. in diameter and the warps 15a of 0.22 mm. in diameter. Diameter of the bottom base and the hight of the cage-shaped screen burner are 50 mm. and 140 mm., respectively.

A reflector plate 211 having its surface Cu-Ni-Cr plated is fixedly secured to the base frame 210 so that the surface forms a parabolic surface of which focus is positioned at the centre of the cage-shaped screen burner 206.

In operation of the embodiment shown in FIG. 9, when the cock 202 for adjusting the flow of fuel is opened, the fuel gas supplied through the fuel supply pipe 201 is ejected into the mixing tube 204 from the tip of the ejecting nozzle 203. At this time, by sucking action of the ejected gas, air is drawn into the mixing tube 204 through the port composed of the preset air damper base 205a and air damper rotatable plate 105b of the control means 205 for adjusting inflow of the primary air. The primary air thus drawn in is mixed sufficiently with the fuel gas within the mixing tube 204 and delivered into the screen burner 206 through the terminal portion of the mixing chamber of the mixing tube 204.

In this case, if the caliber $c$ of the inlet for the primary air is small, suction of air is insufficient resulting in occurrence of imperfect combustion. On the contrary, when the caliber is larger than needed, the size of the apparatus merely increases without resulting in appreciable promotion of sucking effect. If the diameter $d$ of the neck portion of the inlet for the primary air is small, sucked air is insufficient for perfect combustion, and if it is too large, suction effect is weakened resulting in want of air.

The optimum length of the spread portion $l$ may be determined in connection with the diameter $d$ of the neck portion and the length must be 6 to 8 times as large as the diameter of the neck portion in order to mix the fuel gas with the sucked air sufficiently. Further, the optimum diameter of the widest part of the spread portion $l$ may be determined in accordance with the specification of the burner apparatus. If this diameter is too large, velocity of the mixed gas ejected from the nozzle 203 will be lowered and as a result backfiring might be caused. If it is too small, velocity of the mixed gas at the orifices of the cylindrical screen burner will be increased resulting in uneven reaction in and hence uneven red heat of the screen burner. The maximum diameter $e$ of the spread portion $l$ is preferably one to three times as large as the diameter of the neck portion.

The mixed gas which is supplied to the cage-shaped screen burner 206, being applied with adequate resistance by the wire elements of the screen burner 206, is ejected uniformly over the surface of the burner through its meshes and burned by ignition at the surface of the burner. This combustion is composed of a layer of very short flames on the surface of the screen burner. Heat of this combustion heats up the cage-shaped screen burner itself to red heat to radiate heat radiation. Part of the heat radiation radiated from all over the cage-shaped screen burner 206 is directed toward the reflector plate 211, and then partly absorbed thereby and for the most part reflected thereby to irradiate the surroundings to be heated.

Referring to FIG. 10 which illustrates still another embodiment according to the present invention, there is shown a radiating burner apparatus having a spherical screen burner. A fuel supply pipe 301 is rigidly secured to a base frame 110 and has a control cock 302 mounted thereon for adjusting flow in the pipe 301. A nozzle 303 for ejecting fuel is mounted on the end of the fuel supply pipe 301 and opposite to a trumpet-like inlet for primary air of a mixing tube 304. Between the ejecting nozzle 303 and the mixing tube 304 there is disposed an adjustable control means 305 for adjusting inflow of the primary air. Spherical metal screen burner 306 is at its lower ends connected with the adjacent end 304a of the mixing tube 304 through a collar 306a for fixing the screen burner 306 to the mixing tube 304. The nozzle 303 is threaded into the supply pipe 301. A washer 313 which is fitted over the nozzle 303 is pressed against and engaged with a stepped portion formed at the connection of the fuel supply pipe 301 with the nozzle 303 by a coil spring 312. The end of the coil spring 312 remote from the washer 313 bears resiliently against an air damper rotatable plate 305b of the control means 305 for adjusting inflow of the primary air. The control means 305 for adjusting inflow of the primary air comprises an air damper base 305a which is rigidly mounted on the end face of the inlet for the primary air of the mixing tube 304 and the air damper rotatable plate 305b which is rotated about the axis of the nozzle 303 in sliding contact with the air damper base 305a by means of the coil spring 312. Each of the air damper base 305a and rotatable plate 305b is provided with two throughbores or vent ports each in the form of a sector having vertex angle of 90° which are symmetrically disposed in respect to the axis of the nozzle 303. While the fuel is to be burned in the burner apparatus, the air damper rotatable plate 305b is adjusted and fixed in a predetermined position relative to the air damper base 305a according to heat value of the fuel used to supply sufficient primary air to maintain optimum burning condition. The mixing tube 304 comprises the inlet for the primary air and a mixing chamber for mixing the primary air with the fuel. The inlet for the primary air is tapered to form a trumpet-like portion, and after passing through a narrowest neck portion gradually enlarged with moderate gradient.

The structure of the mixing tube 304 may be determined in dimension according to the configuration and capacity of the burner apparatus. When this embodiment is to be used with propane gas of 11,000 kcal./kg. heat value, its structure may be similar to that of the embodiment described previously in connection with FIG. 5.

A fixture collar 306a is mounted on the lower end of the spherical screen burner 306 and the adjacent end of the mixing tube 304 is adapted to be inserted into the fixture collar 306a. A packing 307 is interposed between the mixing tube 304 and the fixture collar 306a in order to prevent leakage of gas.

Such a spherical screen burner 306 is formed by connecting a plurality of flat screens 306' which are appropriately cut together as shown in FIG. 11 and their junctions are, for example, welded in superposed condition as shown in FIG. 3b. The spherical screen burner can be readily attached to and detached from the mixing tube 304 by inserting the fixture collar 306a into and pulling out from, respectively, the adjacent end 304a of the mixing tube 304.

The spherical screen burner in this embodiment is constructed as done in the embodiment shown in FIGS. 4a and 4b and mesh may be determined according to the burning capacity and dimensional specification of the burner apparatus. In this embodiment, propane gas of heat value of 11,000 kcal./kg. is used in a burner apparatus of burning capacity of 2100 kcal./h., the first warp and second weft groups 15 and 14, respectively, of wire elements are arranged in 16 and 120 wire elements per inch, respectively. The wefts 14a are of 0.30 mm. in diameter and the warps 15a of 0.22 mm. in diameter. Diameter of the spherical screen burner 306 is 86 mm.

A reflector plate 311 having its surface Cu-Ni-Cr plated is fixedly secured to the base frame 310 so that the surface forms a parabolic surface of which focus is positioned at the centre of the spherical screen burner 306.

In operation of the embodiment shown in FIG. 10, when the control cock 302 for adjusting the flow of fuel is opened, the fuel gas supplied through the fuel supply pipe 301 is ejected into the mixing tube 104 from the tip of the ejecting nozzle 303. At this time, by sucking action of the ejected gas, air is drawn into the mixing tube 304 through the vent ports composed of the preset air damper base 105a and air damper rotatable plate 105b of the control means 105 for adjusting inflow of the primary air. The primary air thus drawn in is mixed sufficiently with the fuel gas within the mixing tube 304 and delivered into the spherical screen burner 306 through the terminal portion of the mixing chamber of the mixing tube 304.

In this case, if the caliber of the inlet for the primary air is small, suction of the air will be insufficient resulting in occurrence of imperfect combustion. On the contrary, when the caliber is larger than needed, the size of the apparatus merely increases without resulting in appreciable promotion of sucking effect. If the diameter of the neck portion of the inlet for the primary air is small, sucked air is insufficient for perfect combustion, and if it is too large, suction effect is weakened resulting in want of air.

The optimum length of the spread portion $l$ may be determined in connection with the diameter $d$ of the neck portion, and the length must be 6 to 8 times as large as the diameter of the neck portion in order to mix the fuel gas with the sucked air sufficiently.

Further, the optimum diameter of the widest part of the spread portion $l$ may be determined according to the specification of the burner apparatus. If the diameter is too large, velocity of the mixed gas ejected from the nozzle 303 will be lowered and as a result backfiring might be caused. If it is too small, velocity of the mixed gas at the orifices of the spherical screen burner will be increased resulting in uneven reaction in and hence uneven red heat of the screen burner. The maximum diameter $e$ of the spread portion $l$ preferably one to three times as large as the diameter of the neck portion. The mixed gas, being applied with adequate resistance by the wire elements of the screen burner 306, is ejected uniformly over the surface of the burner through its meshes and burned by ignition at the surface of the burner. This combustion is composed of a layer of exceedingly short flames on the surface of the spherical screen burner. Heat of this combustion heats up the screen burner 306 itself to red heat to produce heat radiation. Part of the heat radiation radiated from the screen of the spherical screen burner 306 is directed toward the reflector plate 311, and then partly absorbed thereby and for the most part reflected thereby to irradiate the surroundings to be heated.

Figure 13:
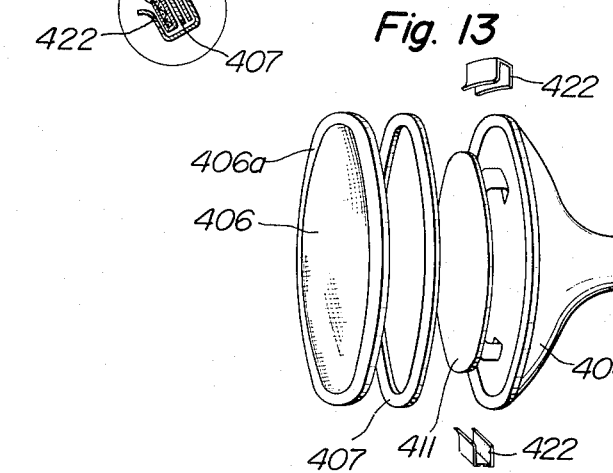
FIG. 13 shows an exploded perspective view of the screen burner portion shown in FIG. 12.

Referring to FIGS. 12 and 13 which illustrate still another embodiment according to the present invention, there is shown a radiating burner apparatus having a curved dish-like screen burner. A fuel supply pipe 401 is rigidly secured to a base frame 410 and has a control cock 402 mounted thereon for adjusting flow in the pipe 401. A nozzle 403 for ejecting fuel is mounted on the end of the fuel supply pipe 401 and opposite to a trumpet-like inlet for primary air of a mixing tube 404. Between the ejecting nozzle 303 and the mixing tube 404 there is disposed an adjustable control means 405 for adjusting inflow of the primary air. The end of the mixing tube 404 remote from the nozzle 403 constitutes a mixing chamber 404a in which a heat radiating reflector plate 411 is disposed and serves as a diffusing plate for diffusing the mixed gas uniformly. A curved dish-like metal screen burner 406 is press fitted to the mixing chamber 404a by means of a fixture frame 406a. The nozzle 403 is threaded into the supply pipe 401 and a washer 413 which is fitted over the nozzle 403 is pressed against and engaged with a stepped portion formed at the connection of the fuel supply pipe 401 with the nozzle 403 by a coil spring 412. The end of the coil spring 412 remote from the washer 413 bears resiliently against an air damper rotatable plate 405b of the control means 405 disposed between the nozzle 403 and the mixing tube 404 for adjusting inflow of the primary air. The control means 405 for adjusting inflow of the primary air comprises an air damper base 305a which is rigidly mounted on the end face of the inlet for the primary air of the mixing tube 404 and the air damper rotatable plate 405b which is rotated about the axis of the nozzle 403 in sliding contact with the air damper base 405a by means of the coil spring 412. Each of the air damper base 305a and rotatable plate 305b is provided with two throughbores or vents, each in the form of a sector having vertex angle of 90°, which are symmetrically disposed in respect to the axis of the nozzle 403. When the fuel is to be burned in the burner apparatus, the air damper rotatable plate 405b is adjusted and fixed in a predetermined position relative to the air damper base 405a in accordance with heat value of the fuel used to supply sufficient primary air to maintain optimum burning condition. The mixing tube 404 comprises the inlet for the primary air and the mixing chamber 404a for mixing the primary air with the fuel. The inlet for the primary air is tapered to form a trumpet-like portion, and after passing through a narrowest neck portion gradually enlarged with moderate gradient.

Structure of the mixing tube 404 may be determined in dimension according to the configuration and capacity of the burner apparatus. When this embodiment is to be used with town gas of 3600 kcal./m.$^3$ heat value, its structure may be similar to that of the embodiment described previously in connection with FIG. 1. When it is to be used with propane gas of 11,000 kcal./kg. heat value, its structure may be similar to that of the embodiment shown in FIG. 5. The reflector plate 411 which is disposed within the mixing chamber 404a may be of any suitable diameter which can prevent the mixed gas from making a straight advance from the mixing tube to directly impinge upon the curved dish-like burner 406. In this embodiment, diameter of the reflector plate 411 is 140 mm. and the dish-like burner 406 is spaced from the reflector plate by 20 to 25 mm.

The reflector plate 411 is preferably coated with white enamel to give reflecting action.

In order to construct the burner, after a flat metal screen burner 406 is inserted into a fixture frame 406a for fitting a screen for burner and a packing is disposed between the end of the mixing chamber 404a and the fixture frame 406a, the fixture frame 406a and the end of the mixing chamber 404a are pressed together in fixed relation by means of a resilient U-shaped fitting 422. When the curved dish-like screen burner 406 is to be removed from the mixing chamber 404a, it is effected easily by removing the fitting 422.

Curved portion of the curved dish-like screen burner 406 is of, for example, 300 mm. in radius of curvature and adapted to absorb thermal dilatation and contraction of the burner during combustion. The curved dish-like screen burner 406 is constructed as done in the embodiment shown in FIGS. 4a and 4b, and its mesh may be determined according to the burning capacity and dimensional specification of the burner apparatus. In this embodiment propane gas of 11,000 kcal./kg. heat value is used in a burner apparatus of 2100 kcal./h. burning capacity. The first warp and second weft groups 15 and 14, respectively, of wire elements are arranged in 16 and 120 wire elements per inch, respectively. The wefts 14a are of 0.30 mm. in diameter and the warps 15a of 0.22 mm. in diameter. Diameter of the curved dish-like screen burner is 170 mm.

In operation, when the cock 402 for adjusting the flow of fuel is opened, the fuel gas supplied through the fuel supply pipe 401 is ejected into the mixing tube 404 from the tip of the ejecting nozzle 203. At this time, by sucking action of the ejected gas, air is drawn into the mixing tube 404 through the ports composed of the preset air damper base 405a and air damper rotatable plate 405b of the control means 405 for adjusting inflow of the primary air. The primary air thus drawn in is mixed sufficiently with the fuel gas with the mixing tube 404, and impinges upon the reflector plate 411. The mixed fuel is diffused by the reflector plate 411 and delivered into the screen burner 406 through the mixing chamber 404a.

In this case, if the caliber c of the inlet for the primary air is small, suction of air is insufficient resulting in occurrence of imperfect combustion. On the contrary, when the caliber is larger than needed, the size of the burner apparatus merely increases without resulting in appreciable promotion of sucking effect.

If the diameter d of the neck portion of the inlet for the primary air is small, sucked air is insufficient for perfect combustion, and if it is too large, suction effect is weakened resulting in want of air.

The optimum length of the spread portion l may be determined in connection with the diameter of the neck portion and the length must be 6 to 8 times as large as the diameter of the neck portion in order to mix the fuel gas with the sucked air sufficiently. Further, the optimum diameter of the widest part of the spread portion l may be determined in accordance with the specification of the burner apparatus. If this diameter is too large, velocity of the mixed gas ejected from the nozzle 403 will be lowered and as a result backfiring might be caused. If it is too small, velocity of the mixed gas at the orifices of the screen burner will be increased resulting in uneven reaction in and hence uneven red heat of the screen burner. The maximum diameter e of the spread portion l is preferably one to three times as large as the diameter of the neck portion.

The mixed gas which is supplied to the curved dish-like screen burner 406, being applied with adequate resistance by the wire elements of the screen burner 406, is ejected uniformly over the surface of the burner through its meshes and burned by ignition at the surface of the burner. This combustion is composed of a layer of very short flames on the surface of the screen burner. Heat of this combustion heats up the curved dish-like screen burner itself to red heat to radiate heat radiation.

As a result, objects to be heated in front of the burner apparatus are heated by this radiation. Although the curved dish-like screen burner expands as a consequence of rise of its temperature while the fuel is burned, expansion is effected uniformly in the direction toward convex and absorbed by the screen burner itself and is prevented from being undulated. When burning is interrupted, the curved dish-like screen burner contracts uniformly and there is no possibility to be undulated.

Since many changes could be made in the above construction and many apparently widely different embodiments of this invention could be made without departing from the spirit and scope thereof, it is intended that all matter contained in the above description or shown in the accompanying drawings shall be interpreted as illustrative and not in a limiting sense.

What we claim is:

1. A radiating burner apparatus comprising a chamber adapted to receive a mixture of air and fuel for burning upon ejection of said mixture from said chamber; and a screen burner communicating with said chamber, said screen burner comprising a plurality of elongated elements interwoven to provide a multiplicity of orifices for ejecting said mixture, each of said orifices being inclined with respect to a line normal to the surface of said screen burner for effecting burning of said mixture close to said orifices for rendering said screen burner effective as a heat radiator, said elongated elements comprising a first group of wire elements and a second group of wire elements having a diameter different from said first group of wire elements, said first group of wire elements being from 0.12 to 0.55 mm. in diameter and arranged in parallel relation of from 10 to 30 wire elements per inch, said second group of wire elements being from 0.11 to 0.45 mm. in diameter and arranged in parallel relation of from 70 to 230 wire elements per inch, each wire element of said second group being woven zigzag with respect to said wire elements of said first group, said wire elements of said second group being in contacting relationship with respect to said wire elements of said first group, adjacent wire elements of said second group being in contacting relationship with each other remote from said first wire elements whereby said orifices are formed by lines linking the points of contact of said wire elements.

2. A radiating burner apparatus comprising a chamber adapted to receive a mixture of air and fuel for burning upon ejection of said mixture from said chamber; and a screen burner communicating with said chamber, said screen burner comprising a plurality of elongated elements interwoven to provide a multiplicity of orifices for ejecting said mixture, each of said orifice being inclined with respect to a line normal to the surface of said screen burner for effecting burning of said mixture close to said orifices for rendering said screen burner effective as a heat radiator, said elongated elements comprising a first group of elongated elements and a second group of interwoven elongated elements, said second group of elongated elements having a cross-sectional size different from said first group of elongated elements.

3. The combination of claim 2, wherein said elongated elements comprise wires, adjacent wires of said second group being in contacting relationship with each other remote from said wires of said first group.

4. A radiating burner apparatus comprising a chamber adapted to receive a mixture of air and fuel for burning upon ejection of said mixture from said chamber; a screen burner communicating with said chamber, said screen burner comprising a plurality of elongated elements interwoven to provide a multiplicity of orifices for ejecting said mixture, each of said orifices being inclined with respect to a line normal to the surface of said screen burner for effecting burning of said mixture close to said orifices for rendering said screen burner effective as a heat radiator, and a base frame for supporting said screen burner, said screen burner further comprising an elongated tube connected at one of its ends with said chamber and said frame, a cover adapted for mating with the other end of said tube, and spring means attached to said base frame for urging said cover against said other end of said tube for releasably supporting said cover and said other end of said tube.

5. A radiating burner apparatus according to claim 1 wherein said screen burner is in the form of an elongated cylinder.

6. A radiating burner apparatus according to claim 5 having a plurality of screen burners, said screen burners being arranged parallel and close to each other.

7. A radiating burner apparatus according to claim 1 wherein said screen burner is in the form of a cage.

8. A radiating burner apparatus according to claim 1 wherein said screen burner is in the form of a sphere.

9. A radiating burner apparatus according to claim 1 wherein said screen burner is in the form of a curved dish.

References Cited by the Examiner
UNITED STATES PATENTS

| | | | |
|---|---|---|---|
| 1,112,862 | 10/1914 | Spahr et al. | 158—118 |
| 1,427,371 | 8/1922 | Garbarini | 126—92 |
| 1,946,791 | 2/1934 | Hagan | 158—118 X |
| 2,336,816 | 12/1943 | Thompson | 126—92 X |
| 2,528,738 | 11/1950 | Calkins et al. | 158—116 |
| 3,084,736 | 4/1963 | Mentel et al. | |

FREDERICK KETTERER, *Primary Examiner.*

JAMES W. WESTHAVER, FREDERICK L. MATTESON, JR., *Assistant Examiners.*